United States Patent
Ota et al.

(10) Patent No.: US 6,842,311 B2
(45) Date of Patent: Jan. 11, 2005

(54) PRECISE POSITIONING ACTUATOR FOR HEAD ELEMENT AND HEAD DEVICE WITH THE ACTUATOR

(75) Inventors: Norikazu Ota, Tokyo (JP); Takeshi Wada, Tokyo (JP); Takashi Honda, Tokyo (JP)

(73) Assignee: TDK Corporation, Tokyo (JP)

( * ) Notice: Subject to any disclaimer, the term of this patent is extended or adjusted under 35 U.S.C. 154(b) by 80 days.

(21) Appl. No.: 10/100,019

(22) Filed: Mar. 19, 2002

(65) Prior Publication Data

US 2002/0176212 A1 Nov. 28, 2002

(30) Foreign Application Priority Data

Mar. 23, 2001 (JP) ........................................ 2001-084096

(51) Int. Cl.⁷ .............................................. G11B 5/596
(52) U.S. Cl. ................................................... 360/294.4
(58) Field of Search ........................... 360/294.4, 294.5, 360/294.1; 369/300

(56) References Cited

U.S. PATENT DOCUMENTS

| 5,745,319 A | 4/1998 | Takekado et al. |
| 6,246,552 B1 * | 6/2001 | Soeno et al. ............. 360/294.4 |
| 6,282,066 B1 * | 8/2001 | Bonin ...................... 360/294.1 |
| 6,362,939 B1 * | 3/2002 | Crane et al. ............. 360/294.5 |
| 6,414,822 B1 * | 7/2002 | Crane et al. ............. 360/294.5 |
| 6,414,823 B1 * | 7/2002 | Crane et al. ............. 360/294.5 |
| 6,580,687 B1 * | 6/2003 | Cumpson et al. ........... 369/300 |
| 2002/0051326 A1 | 5/2002 | Shiraishi et al. |

FOREIGN PATENT DOCUMENTS

| JP | 06020415 | 1/1994 |
| JP | 8-180623 | 7/1996 |
| JP | 2002074871 A * | 3/2002 |

\* cited by examiner

*Primary Examiner*—Tianjie Chen
(74) *Attorney, Agent, or Firm*—Burns, Doane, Swecker & Mathis, L.L.P.

(57) ABSTRACT

A precise positioning actuator to be fixed to a head slider provided with at least one head element, for precisely positioning the at least one head element includes a base, and a pair of movable arms extending from the base and having slider fixing portions to be fixed to side surfaces of the head slider at top end sections thereof. Each of the pair of movable arms includes an arm member and an actuator layer formed on a side surface of the arm member, for displacing the arm member in response to a drive signal applied thereto. The actuator layer is terminated on the side surface of the arm member at a frontward position from the slider fixing portion.

18 Claims, 4 Drawing Sheets

PRECISE POSITIONING ACTUATOR FOR HEAD ELEMENT AND HEAD DEVICE WITH THE ACTUATOR

FIELD OF THE INVENTION

The present invention relates to a precise positioning actuator for a head element such as a thin-film magnetic head element or an optical head element and to a head device with the actuator.

DESCRIPTION OF THE RELATED ART

In a magnetic disk drive apparatus, thin-film magnetic head elements for writing magnetic information into and/or reading magnetic information from magnetic disks are in general formed on magnetic head sliders flying in operation above the rotating magnetic disks. The sliders are supported at top end sections of suspensions, respectively.

Recently, recording and reproducing density along the radial direction or along the track width direction in the magnetic disk (track density) rapidly increases to satisfy the requirement for ever increasing data storage capacities and densities in today's magnetic disk drive apparatus. For advancing the track density, the position control of the magnetic head element with respect to the track in the magnetic disk by a voice coil motor (VCM) only has never presented enough accuracy.

In order to solve this problem, an additional actuator mechanism is mounted at a position nearer to the magnetic head slider than the VCM so as to perform fine precise positioning that cannot be realized by the VCM only. The techniques for realizing precise positioning of the magnetic head are described in for example U.S. Pat. No. 5,745,319 and Japanese patent publication No. 08180623 A.

As for a precise positioning actuator, there are various structures of actuator such as for example a load-beam structure actuator and a piggy-back structure actuator.

The load-beam structure actuator has two piezoelectric elements of PZT attached on a load beam of a suspension. These PZT elements are driven in a manner to support with each other to displace the load beam so as to perform fine precise positioning of a magnetic head slider mounted on the load beam.

The piggy-back structure actuator is formed by piezoelectric material of PZT in an I-character shape with one end section to be fixed to a suspension, the other end section to be fixed to a magnetic head slider and a pillar shaped movable arm connected between these end sections. The PZT is driven to perform fine precise positioning of the magnetic head slider directly attached to this actuator. On the suspension, stepwise stacked are the actuator and the magnetic head slider, namely, the actuator is caught between the suspension and the slider to form a stacked cantilever structure.

However, the aforementioned conventional precise positioning actuators had following various problems:

(1) Mechanical resonance was occurred at a relatively low frequency;
(2) Since the actuator as a whole consists of piezoelectric material such as PZT of a brittle material, shock resistance is very poor. Particularly, since in case of a piggy-back structure actuator, the actuator and the magnetic head slider are stacked to form a cantilever structure, a shock easily occurs with a moment and also shock resistance is extremely poor;
(3) Depending upon the size of the magnetic head slider, a travel of the magnetic head element during the precise positioning operation varies. Thus, it is difficult to always obtain enough stroke;
(4) Handling at the time of an assembly of a head gimbal assembly (HGA) is very difficult;
(5) Particularly, in case of a piggy-back structure actuator, because of the stepwise stacked structure, a total thickness of the HGA around the magnetic head slider increases by the thickness of the actuator;
(6) In case of a piggy-back structure actuator, because of three-dimensional and complicated attachment structure, the handling at the time of an assembly of the HGA is extremely difficult and it is impossible to use a conventional HGA assembly equipment causing productivity to be very worse; and
(7) In order not to interfere with the movement of the piggy-back structure actuator, it is necessary to assemble with keeping air gaps between the actuator and the magnetic head slider and also between the actuator and the suspension. However, forming of such air gaps will more decrease the shock resistance and it is difficult to precisely keep the air gaps constant. Particularly, since it is difficult to keep the suspension, the actuator and the magnetic head slider in parallel precisely, the head characteristics deteriorates.

To solve the aforementioned various problems, proposed was an actuator provided with a pair of metal plate movable arms for fixing and catching a magnetic head slider in a space between the movable arms (U.S. patent Ser. No. 09/972,939 now pending). According to such actuator, the mechanical resonance frequency can be heightened, the shock resistance can be greatly improved and an enough stroke can be expected.

However, this proposed actuator has the following problems:

(A) A material to be used for the actuator is limited because it is necessary to provide a very large displacement;
(B) A high drive voltage required to apply to the actuator in order to achieve a large displacement can have a detrimental effect on an electromagnetic conversion characteristics of the magnetic head element; and
(C) Flexibility in designing an actuator shape is quite low because a material and a structure of the actuator are limited and thus a driver structure of the actuator and driven directions are determined.

SUMMARY OF THE INVENTION

It is therefore an object of the present invention to provide a precise positioning actuator for a head element and a head device with the actuator, whereby a desired stroke can be more effectively obtained with keeping the aforementioned advantages of the already proposed actuator that has a structure for catching side surfaces of the magnetic head slider in the movable arms.

According to the present invention, a precise positioning actuator to be fixed to a head slider provided with at least one head element, for precisely positioning the at least one head element includes a base, and a pair of movable arms extending from the base and having slider fixing portions to be fixed to side surfaces of the head slider at top end sections thereof. Each of the pair of movable arms includes an aim member and an actuator layer formed on a side surface of the arm member, for displacing the arm member in response to a drive signal applied thereto. The actuator layer is terminated on the side surface of the arm member at a frontward position from the slider fixing portion.

Also, according to the present invention, a head device includes a head slider provided with at least one head element, and a precise positioning actuator fixed to the head slider for precisely positioning the at least one head element. The actuator includes a base, and a pair of movable arms extending from the base and having slider fixing portions fixed to side surfaces of the head slider at top end sections thereof. Each of the pair of movable arms includes an arm member and an actuator layer formed on a side surface of the arm member, for displacing the arm member in response to a drive signal applied thereto. The actuator layer is terminated on the side surface of the arm member at a frontward position form the slider fixing portion.

The actuator layer is terminated back from the slider fixing portion so that the actuator layer is not laminated on the slider fixing portion. Thus, a stiffness of the movable arms is not increased so high but is kept low, and therefore a large stroke of the actuator can be expected even if the actuator layers do not have an ability for providing a large displacement. As a result, the actuator layers can be driven by a low voltage and therefore no detrimental effect on an electromagnetic conversion characteristics of a magnetic head element will occur. Also, a material priding a low displacement can be selected for the actuator layers. Furthermore, since a material and a structure for the actuator are not limited, flexibility in designing an actuator shape becomes extremely high.

Furthermore, since the actuator holds the head slider such that the slider is mounted in a space between the movable arms, the thickness of the HGA around the head slider does not increase even if the actuator is attached. Also, no cantilever structure of the actuator and the head slider is formed, the shock-resistance can be greatly improved. In addition, since the head slider is caught in between the movable arms, the top end sections of the movable arms, which actually transfer the displacement to the slider, can be extended to always position at the top end of the head slider. Thus, it is possible to provide an enough stroke of the head slider.

It is preferred that the frontward position at which the actuator layer is terminated is a position at 50% of a total length of the arm member or more distance from the base. In this case, it is more preferred that the frontward position at which the actuator layer is terminated is a position at 50–75% of a total length of the arm member distance from the base.

It is preferred that a beginning position of the actuator layer locates on a side surface of the base. Namely, it is preferred that the actuator layer is laminated on the base even it is a short length.

It is also preferred that a beginning position of the actuator layer locates at a front of a rear edge of the actuator.

It is preferred that each of the pair of movable arms is shaped so that there exists an air gap between the side surface of the head slider and the movable arm except for the slider fixing portion.

It is preferred that the actuator layer includes a piezoelectric element formed or adhered on the side surface of the arm member.

It is further preferred that a main portion of the actuator is made of a sintered ceramic or a metal plate.

It is preferred that the at least one head element is at least one thin-film magnetic head element.

Furthermore, according to the present invention, a head device includes a head section formed in a thin plate shape and provided with at least one head element, and a precise positioning actuator section integrally fixed to the head section for precisely positioning the at least one head element. The actuator section includes a base, and a pair of movable arms extending from the base and having head fixing portions fixed to side ends of the head section at top end sections thereof. Each of the pair of movable arms includes an arm member and an actuator layer formed on a side surface of the arm member, for displacing the arm member in response to a drive signal applied thereto. The actuator layer is terminated on the side surface of the arm member at a frontward position from the head fixing portion.

The actuator layer is terminated back from the head fixing portion so that the actuator layer is not laminated on the head fixing portion. Thus, a stiffness of the movable arms is not increased so high but is kept low, and therefore a large stroke of the actuator section can be expected even if the actuator layers do not have an ability for providing a large displacement. As a result, the actuator layers can be driven by a low voltage and therefore no detrimental effect on an electromagnetic conversion characteristics of a magnetic head element will occur. Also, a material providing a low displacement can be selected for the actuator layers. Furthermore, since a material and a structure for the actuator section are not limited, flexibility in designing an actuator shape becomes extremely high.

Furthermore, since the actuator section holds the head section such that the head section is mounted in a space between the movable arms, the thickness of the HGA around the head section does not increase even if the actuator section is formed. Also, no cantilever structure of the actuator section and the head section is formed, the shock-resistance can be greatly improved. In addition, since the head section is caught in between the movable arms, the top end sections of the movable arms, which actually transfer the displacement to the head section, can be extended to always position at the top end of the head section. Thus, it is possible to provide an enough stroke of the head section.

Since the head section is formed in a thin plate shape and the actuator section is integrally fixed to the head section, a mass of a displaced portion driven by the actuator section is very light and a sufficient displacement can be expected even by a very small drive force. Also, the head element can be fabricated in the head section by a normal manufacturing process. In addition, since the actuator has an individual structure fixed to the head section after being formed, an actuator component capable of providing a sufficient displacement can be used.

It is preferred that the frontward position at which the actuator layer is terminated is a position at 50% of a total length of the arm member or more distance form the base. In this case, it is more preferred that the frontward position at which the actuator layer is terminated is a position at 50–75% of a total length of the arm member distance from the base.

It is preferred that a beginning position of the actuator layer locates on a side surface of the base. Namely, it is preferred that the actuator layer is laminated on the base even it is a short length.

It is also preferred that a beginning position of the actuator layer locates at a front of a rear edge of the actuator.

It is further preferred that the actuator section further includes a static portion extended from the base and located between the pair of movable arms with spaces from the movable arms. In this case, the static portion has at least one air bearing surface (ABS). Since the at least one ABS is formed on the static portion, the attitude of the ABS will not change so as to always keep a stable flying characteristics of the magnetic head device even if the head section is stroked.

It is preferred that the actuator layer includes a piezoelectric element formed or adhered on the side surface of the arm member.

It is further preferred that a main portion of the actuator is made of a sintered ceramic or a metal plate.

It is preferred that the at least one head element is at least one thin-film magnetic head element.

Further objects and advantages of the present invention will be apparent from the following description of the preferred embodiments of the invention as illustrated in the accompanying drawings.

BRIEF DESCRIPTION OF THE DRAWINGS

FIG. 7b is an oblique view illustrating a structure of a magnetic head slider in the embodiment of FIG. 7a;

FIG. 8b is an oblique view illustrating a structure of a magnetic head slider in the embodiment of FIG. 8a.

DESCRIPTION OF THE PREFERRED EMBODIMENTS

Figure 1:
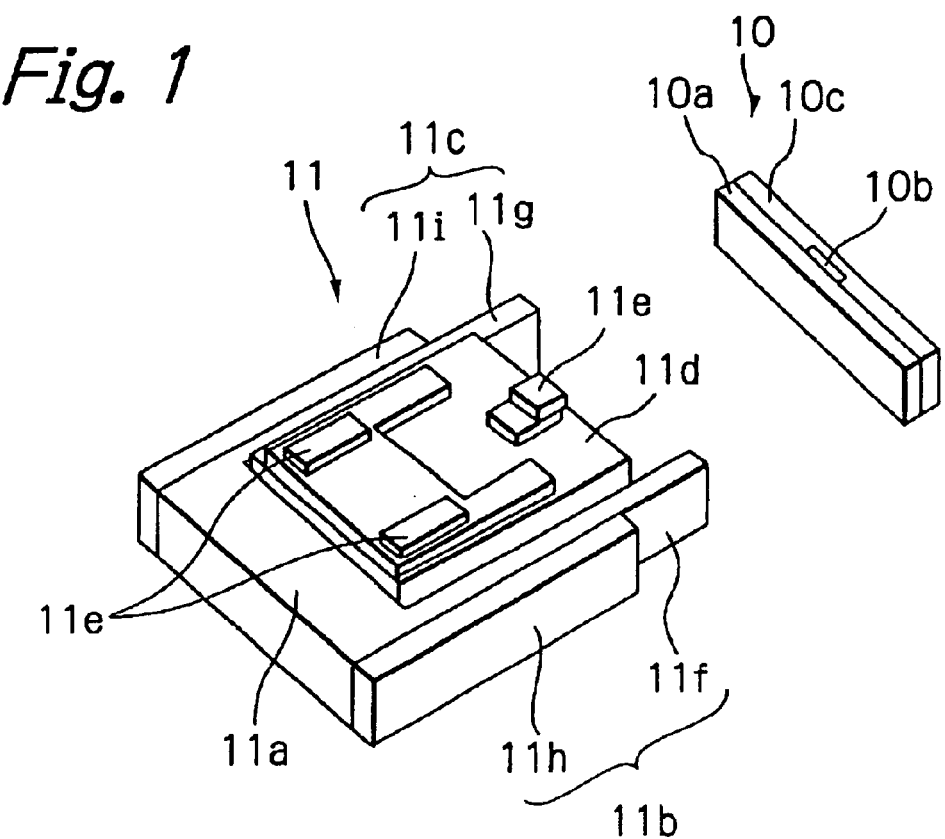
FIG. 1 is an exploded oblique view schematically illustrating a magnetic head device with a precise positioning actuator in a preferred embodiment according to the present invention.
Figure 2:
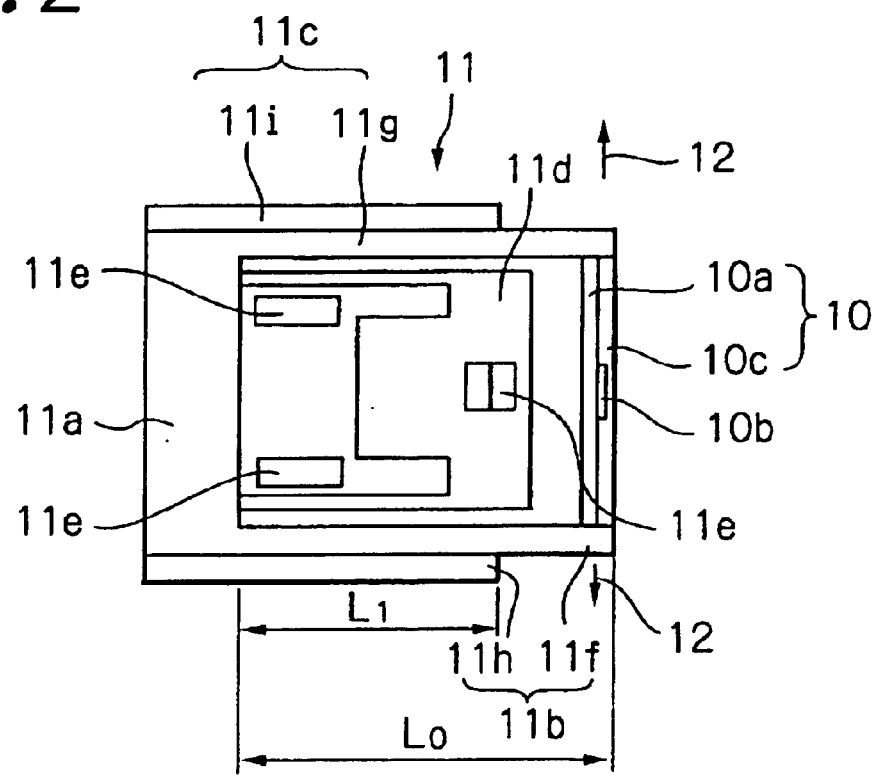
FIG. 2 is a plane view illustrating the magnetic head device in the embodiment of FIG. 1, seen from an air bearing surface (ABS) side.

FIG. 1 schematically illustrates a magnetic head device with a precise positioning actuator in a preferred embodiment according to the present invention, and FIG. 2 illustrates the magnetic head device in the embodiment of FIG. 1, seen from the ABS.

In these figures, reference numeral 10 denotes a magnetic head section with a thin-film layer 10c including a thin-film magnetic head element 10b and its terminal electrodes, and 11 denotes an actuator section. The thin-film layer 10c in the magnetic head section 10 has a thickness of about 35–50 $\mu$m and is formed on a very thin substrate 10a with a thickness of about 50 $\mu$m for example. The actuator section 11 is located at the rear side from an element-formed surface of the magnetic head section 10 and fixed to side ends of the magnetic head section 10 by adhering for example.

The actuator section 11 has a base 11a, a pair of movable arms 11b and 11c extending from the base 11a with keeping substantially perpendicular to this base and a static portion 11d extending frontward from the base 11a with also keeping substantially perpendicular to this base. The static portion 11d is formed between the movable arms 11b and 11c with spaces from these movable arms. The magnetic head section 10 and the actuator section 11 are fixed each other by adhering top end portions of the movable arms 11b and 11c to the side surfaces of the magnetic head section 10, respectively.

On a surface of the static portion 11d, shown in these figures, which surface is substantially perpendicular to the element-formed surface of the magnetic head section 10, ABSs 11e are formed.

The substrate 10a of the magnetic head section 10 consists of an $Al_2O_3$—TiC substrate that has been typically used in the conventional magnetic head. However, in this embodiment, a thickness, namely a length along the front-and-rear direction of the magnetic head slider, of the $Al_2O_3$—TiC substrate is very thin. The thin-film magnetic head element 10b and its terminal electrodes of the magnetic head section 10 are fabricated using for example a conventional thin-film integration technique.

The actuator section 11 is mainly formed, in this embodiment, by a sintered ceramic body such as a zirconia body, with an E-shaped section. The movable arms 11b and 11c of this actuator section 11 are constituted by arm members 11f and 11g and actuator layers 11h and 11i with a piezoelectric (PZT) structure formed by a semiconductor integration technique on side surfaces of the arm members 11f and 11g, respectively. The actuator layers 11h and 11i are formed not only on the side surfaces of the arm members 11f and 11g but also on side surfaces of the base 11a.

Important in this embodiment is that the actuator layers 11h and 11i are not extended to the top end portions of the arm members 11f and 11g at which the members are fixed to the magnetic head section 10 but terminated frontward positions form the top end portions. According to this structure, a stiffness of the movable arms 11b and 11c is not increased so high but is kept low. Thus, a large stroke of the actuator can be expected even if the actuator layers 11h and 11i do not have an ability for providing a large displacement.

As a result, the actuator layers 11h and 11i can be driven by a low voltage and therefore no detrimental effect on an electromagnetic conversion characteristics of the magnetic head element will occur. Also, a material providing a low displacement can be selected for the actuator layers 11h and 11i. Furthermore, since a material and a structure for the actuator section are not limited, flexibility in designing an actuator shape becomes extremely high.

Figure 3:
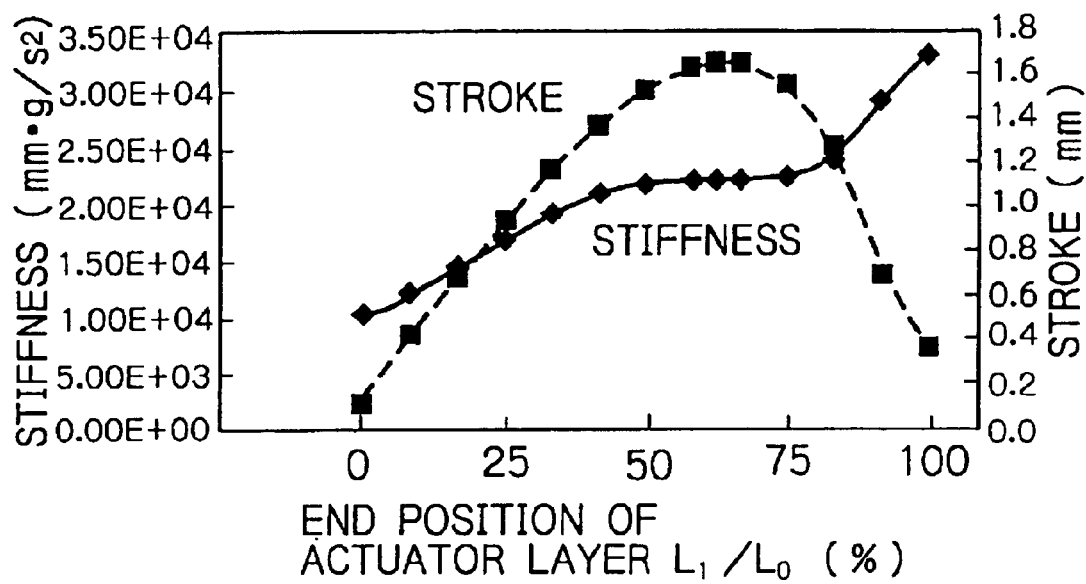
FIG. 3 is a characteristics graph illustrating a relationship between an end position of an actuator layer of the magnetic head device in the embodiment of FIG. 1 and a stroke of a movable arm, and a relationship between the end position of the actuator layer and a stiffness of the movable arm.

FIG. 3 illustrates a relationship between an end position of each actuator layer of thus structured magnetic head device and a stroke of the movable arm, and a relationship between the end position of the actuator layer and a stiffness of the movable arm.

These relationships are obtained by simulations of how the displacement or the stroke at the top end of the movable arm changes in response to a change in the end position of the actuator layer and how the stiffness of the movable arm changes in response to the change in the end position of the actuator layer. The end position of the actuator layer is represented by a ratio $L_1/L_0$, where L1 is a distance between a front edge of the base and the end position of the actuator layer as shown in FIG. 2, and $L_0$ ($L_0$=1.2 mm in this embodiment) is a total length of the arm member (a length between the front edge of the base and a top end of the arm member as shown in FIG. 2). The stiffness of the movable arm is represented by a necessary force for displacing the magnetic head section by 1 μm. In FIG. 3, the beginning position of the actuator layer is fixed at a position of a rear end of the actuator section, namely at a rear edge of the base 11a.

As will be apparent from FIG. 3, if the actuator layers are formed so as to terminate at positions frontward from the top end portions at which the arm members are fixed to the magnetic head section, preferably at positions of $L_1/L_0 \geq 50\%$ under the conditions that the total length of the arm members is 1.2 mm and a thickness of the magnetic head section is about 100 μm, more preferably at positions of $75\% \geq L_1/L_0 \geq 50\%$ under the same conditions, the stiffness of the movable arms can be kept at a relative low constant value and also an enough stroke can be obtained.

Figure 4:
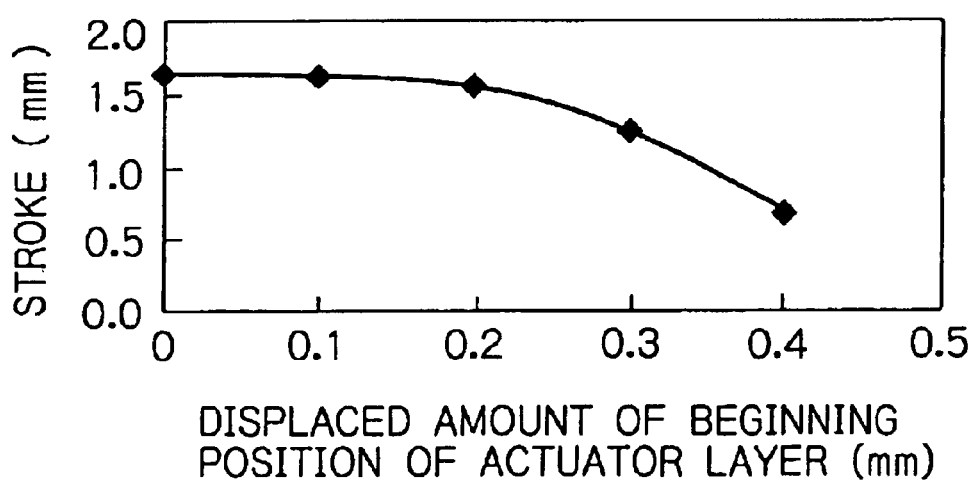
FIG. 4 is a characteristics graph illustrating a relationship between a displaced amount of a beginning position of an actuator layer of the magnetic head device in the embodiment of FIG. 1 and a stroke of the movable arm.
Figure 5:
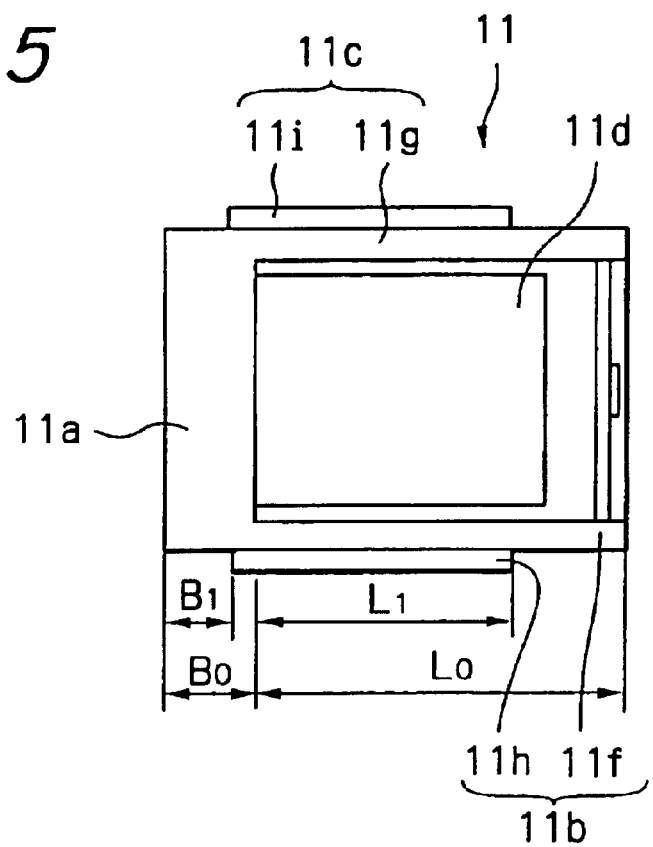
FIG. 5 is a view for illustrating the displaced amount of the beginning position of the actuator layer.

FIG. 4 illustrates a relationship between a displaced amount of the beginning position of the actuator layer of thus structured magnetic head device and a stroke of the movable arm. This relationship is obtained by simulation of how the displacement or the stroke at the top end of the movable arm changes in response to a moved amount of the beginning position of the actuator layer from a rear end of the actuator toward frontward, where the end position of the actuator layer is fixed and the distance $L_1$ between the front edge of the base and the end position of the actuator layer is a length $L_1$=0.75 mm ($L_1/L_0$=62.5%) that provides the maximum stroke. The moved amount of the beginning position of the actuator layer is represented by a distance $B_1$ between a rear edge of the base 11a and the beginning position of the actuator layer as shown in FIG. 5. This moved amount may be represented by $B_1/B_0$, where $B_0$ is a distance between the front edge and the rear edge of the base 11a. In this embodiment, $B_0$=0.3 mm.

As will be apparent from FIG. 4, if the moved amount of the beginning position of the actuator layer is equal to or less than 0.3 mm ($B_1/B_0 \leq$0.3 mm/0.3 mm=1), preferably equal to or less than 0.2 mm ($B_1/B_0 \leq$0.2 mm/0.3 mm=⅔), the stroke does not significantly drop. In other words, in case that the beginning position of the actuator layer lies at the side surface of the base, the stroke does not significantly drop. This is assumed that since the actuator layer is laminated on the side surface of the base, the stiffness of this base increases and thus the tight fixing to the suspension is secured resulting the stroke of the actuator to improve.

Since this actuator section 11 is individually fabricated from the magnetic head section 10, any type of actuator structures such as an electrostatic effect structure, an electrostrictive effect structure and electromagnetic inductive structure can be easily adopted other than a piezoelectric effect structure.

A size of the magnetic head device combined by the magnetic head section 10 and the actuator section 11 in this embodiment is 1.5 mm×1.3 mm×0.3 mm for example. However, it is possible to fabricate a magnetic head device with a size of 1.25 mm×1.0 mm×0.3 mm which is substantially the same as that of the conventional magnetic head device.

By applying a drive voltage to the actuator layers 11h and 11i via signal electrodes (not shown), the movable arms 11b and 11c linearly displace to lateral directions as shown by an arrow 12. Thus, the magnetic head section 10 linearly displaces in the lateral directions in the similar manner to precise position the magnetic head element 10b.

Since the magnetic head section 10 that is a movable part is thin and very light in mass, a sufficient displacement can be expected even by a very small drive force. It is important that the displacement is occurred at the magnetic head section 10 only and that no displacement is occurred at the ABSs 11e formed on the static portion 11d of the actuator section 11. Therefore, the attitude of the ABSs 11e will not change so as to always keep a stable flying characteristics of the magnetic head device.

Because of the fact that the actuator layers are terminated at positions frontward from the portions at which the actuator section is fixed to the magnetic head section, and of the extremely light mass of the movable part, following various advantages can be obtained:

(a) An actuator of a low-voltage drive type can be utilized to avoid to have a detrimental effect on an electromagnetic conversion characteristics of the magnetic head element;
(b) An actuator can be formed with a structure and of a material that will present a small displacement force;
(c) High flexibility in designing an actuator can be expected; and
(d) A vibration characteristics of a suspension will not be deteriorated because a mechanical resonance occurs at a relatively high frequency.

Furthermore, since the actuator section in this embodiment holds the magnetic head section such that the head section is mounted in a space between the movable arms, the thickness of the HGA around the magnetic head section does not increase even if the actuator section is formed. Also, no cantilever structure of the actuator section and the magnetic head section is formed, the shock-resistance can be greatly improved. In addition, since the magnetic head section is caught in between the movable arms, the top end sections of the movable arms, which actually transfer the displacement to the head section, can be extended to always position at the top end of the head section. Thus, it is possible to provide an enough stroke of the magnetic head section.

Figure 6:
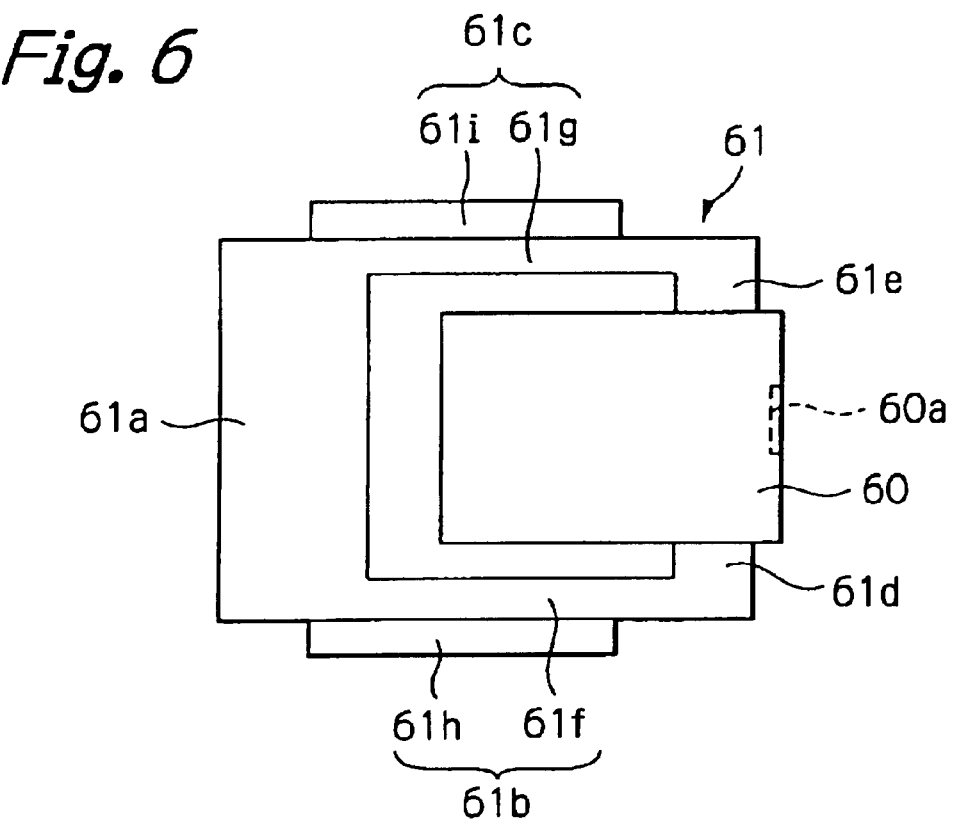
FIG. 6 is a plane view illustrating a magnetic head device with a precise positioning actuator in another embodiment according to the present invention, seen from an ABS side.

FIG. 6 illustrates a magnetic head device with a precise positioning actuator in another embodiment according to the present invention, seen from an ABS side.

In the figure, reference numeral 60 denotes a magnetic head slider with a thin-film magnetic head element (not shown), and 61 denotes an actuator fixed to side surfaces of the magnetic head slider 60 by adhering for example.

The actuator 61 has a base 61a, and a pair of movable arms 61b and 61c extending from the base 61a with keeping substantially perpendicular to this base. The magnetic head slider 60 and the actuator 61 are fixed each other by adhering top end sections 61d and 61e of the movable arms 61b and 61c to the side surfaces of the magnetic head slider 60, respectively.

The actuator 61 is mainly formed, in this embodiment, by a sintered ceramic body such as a zirconia body, with a substantially U-shaped section. The movable arms 61b and 61c of this actuator 61 are constituted by arm members 61f and 61g and actuator layers 61h and 61i with a piezoelectric (PZT) structure formed by a semiconductor integration technique on side surfaces of the arm members 61f and 61g, respectively. The actuator layers 61h and 61i are formed not only on the side surfaces of the arm members 61f and 61g but also on side surfaces of the base 61a.

The top end sections 61d and 61e of the respective movable arms 61b and 61c are bent inwardly, namely toward the magnetic head slider 60 so that only these top end sections 61d and 61e are attached to the side surfaces of the magnetic head slider 60 and that there exists air gaps between the remaining sections of the movable arms 61b and 61c and the side surfaces of the magnetic head slider 60.

Important in this embodiment is that the actuator layers 61h and 61i are not extended to the top end sections 61d and 61e of the arm members 61f and 61g at which the members are fixed to the magnetic head slider 60 but terminated frontward positions from these top end sections. According to this structure, a stiffness of the movable arms 61b and 61c is not increased so high but is kept low. Thus, a large stroke of the actuator can be expected even if the actuator layers 61h and 61i do not have an ability for providing a large displacement.

As a result, the actuator layers 61h and 61i can be driven by a low voltage and therefore no detrimental effect on an electromagnetic conversion characteristics of the magnetic head element will occur. Also, a material providing a low displacement can be selected for the actuator 61. Furthermore, since a material and a structure for the actuator are not limited, flexibility in designing an actuator shape becomes extremely high.

A length, a displacement and a moved amount of beginning positions of the actuator layers in this embodiment are substantially the similar to these of the embodiment of FIG. 1.

Since this actuator 61 is individually fabricated from the magnetic head slider 60, any type of actuator structures such as an electrostatic effect structure, an electrostrictive effect structure and electromagnetic inductive structure can be easily adopted other than a piezoelectric effect structure.

Because of the fact that the actuator layers are terminated at positions frontward from the portions at which the actuator is fixed to the magnetic head slider, following various advantages can be obtained:

(a) An actuator of a low-voltage drive type can be utilized to avoid to have a detrimental effect on an electromagnetic conversion characteristics of the magnetic head element;
(b) An actuator can be formed with a structure and of a material that will present a small displacement force; and
(c) High flexibility in designing an actuator can be expected.

Furthermore, since the actuator in this embodiment holds the magnetic head slider such that the slider is mounted in a space between the movable arms, the thickness of the HGA around the magnetic head slider does not increase even if the actuator is attached. Also, no cantilever structure of the actuator and the magnetic head slider is formed, the shock-resistance can be greatly improved. In addition, since the magnetic head slider is caught in between the movable arms, the top end sections of the movable arms, which actually transfer the displacement to the slider, can be extended to always position at the top end of the slider. Thus, it is possible to provide an enough stroke of the magnetic head slider.

Figure 7A:
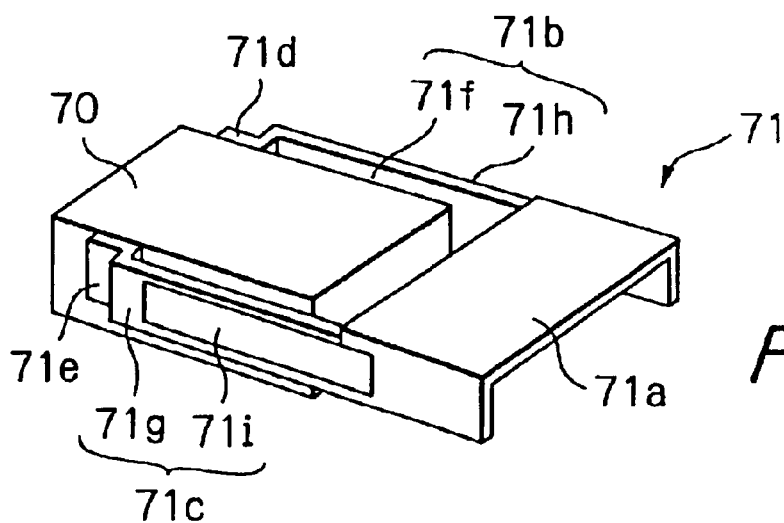
FIG. 7a is an oblique view schematically illustrating a magnetic head device with a precise positioning actuator in a further embodiment according to the present invention.
Figure 7B:
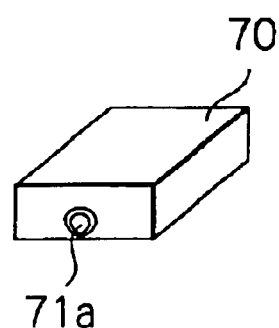

FIG. 7a schematically illustrates a magnetic head device with a precise positioning actuator in a further embodiment according to the present invention, and FIG. 7b illustrates a structure of a magnetic head slider in the embodiment of FIG. 7a.

In these figures, reference numeral 70 denotes a magnetic head slider with a thin-film magnetic head element 70a formed on a substrate, and 71 denotes an actuator fixed to side surfaces of the magnetic head slider 70 by adhering for example.

The actuator 71 has a base 71a, and a pair of movable arms 71b and 71c extending from the base 71a with keeping substantially perpendicular to this base. The magnetic head slider 70 and the actuator 71 are fixed each other by adhering top end sections 71d and 71e of the movable arms 71b and 71c to the side surfaces of the magnetic head slider 70, respectively.

The main portion of the actuator 71 is formed by cutting a resilient metal plate such as a stainless steel plate into individual actuator pieces each having a desired plane shape and by bending each of them in a three-dimensional shape. The movable arms 71b and 71c of this actuator 71 are constituted by arm members 71f and 71g and actuator layers 71h and 71i with a piezoelectric (PZT) structure formed by a semiconductor integration technique on side surfaces of the arm members 71f and 71g, respectively. The actuator layers 71h and 71i are formed not only on the side surfaces of the arm members 71f and 71g but also on side surfaces of the base 71a.

The top end sections 71d and 71e of the respective movable arms 71b and 71c are bent inwardly, namely toward the magnetic head slider 70 so that only these top end sections 71d and 71e are attached to the side surfaces of the magnetic head slider 70 and that there exists air gaps between the remaining sections of the movable arms 71b and 71c and the side surfaces of the magnetic head slider 70.

Important in this embodiment is that the main portion of the actuator 71 is formed by a resilient metal plate and that the actuator layers 71h and 71i are not extended to the top end sections 71d and 71e of the arm members 71f and 71g at which the members are fixed to the magnetic head slider 70 but terminated frontward positions from these top end sections. According to this structure, a stiffness of the movable arms 71b and 71c is not increased so high but is kept low. Thus, a large stroke of the actuator can be expected even if the actuator layers 71h and 71i do not have an ability for providing a large displacement.

As a result, the actuator layers 71h and 71i can be driven by a low voltage and therefore no detrimental effect on an electromagnetic conversion characteristics of the magnetic head element will occur. Also, a metal plate providing a low displacement can be selected for the actuator 71. Furthermore, since a material and a structure for the actuator are not limited, flexibility in designing an actuator shape becomes extremely high.

A length, a displacement and a moved amount of beginning positions of the actuator layers in this embodiment are substantially the similar to these of the embodiment of FIG. 1.

Since this actuator 71 is individually fabricated from the magnetic head slider 70, any type of actuator structures such as an electrostatic effect structure, an electrostrictive effect structure and electromagnetic inductive structure can be easily adopted other than a piezoelectric effect structure.

Because of the fact that the actuator layers are terminated at positions frontward from the portions at which the actuator is fixed to the magnetic head slider, following various advantages can be obtained:

(a) An actuator of a low-voltage drive type can be utilized to avoid to have a detrimental effect on an electromagnetic conversion characteristics of the magnetic head element;
(b) An actuator can be formed with a structure and of a material that will present a small displacement force; and
(c) High flexibility in designing an actuator can be expected.

Furthermore, since the actuator in this embodiment holds the magnetic head slider such that the slider is mounted in a space between the movable arms, the thickness of the HGA around the magnetic head slider does not increase even if the actuator is attached. Also, no cantilever structure of the actuator and the magnetic head slider is formed, the shock-resistance can be greatly improved. In addition, since the magnetic head slider is caught in between the movable arms, the top end sections of the movable arms, which actually transfer the displacement to the slider, can be extended to always position at the top end of the slider. Thus, it is possible to provide an enough stroke of the magnetic head slider.

Figure 8A:
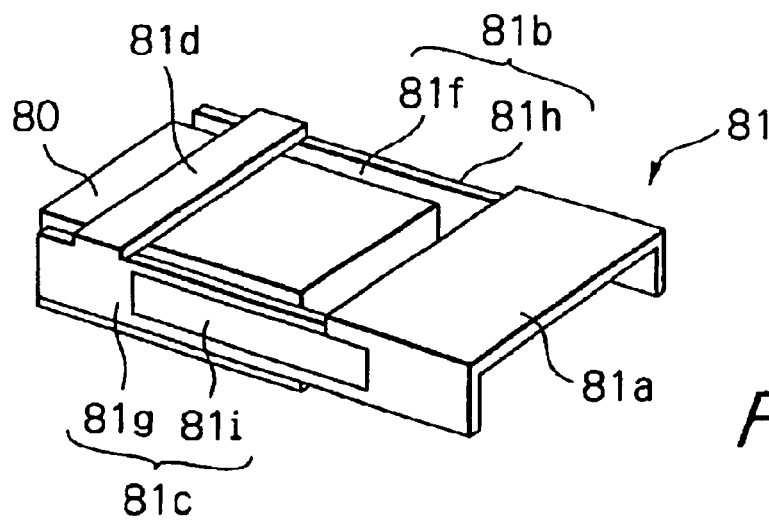
FIG. 8a is an oblique view schematically illustrating a magnetic head device with a precise positioning actuator in a still further embodiment according to the present invention.
Figure 8B:
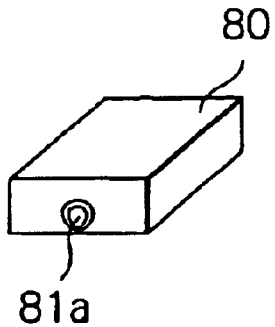

FIG. 8a schematically illustrates a magnetic head device with a precise positioning actuator in a still further embodiment according to the present invention, and FIG. 8b illustrates a structure of a magnetic head slider in the embodiment of FIG. 8a.

In these figures, reference numeral 80 denotes a magnetic head slider with a thin-film magnetic head element 80a formed on a substrate, and 81 denotes an actuator fixed to a surface of the magnetic head slider 80, which surface is opposite to an ABS of the slider, by adhering for example.

The actuator 81 has a base 81a, a pair of movable arms 81b and 81c extending from the base 81a with keeping substantially perpendicular to this base, and a coupling section 81d connected between top end sections of the movable arms 81b and 81c. The magnetic head slider 80 and the actuator 81 are fixed each other by adhering the coupling section 81d to the surface of the magnetic head slider 80 which is opposite to the ABS.

The main portion of the actuator 81 is formed by cutting a resilient metal plate such as a stainless steel plate into individual actuator pieces each having a desired plane shape and by bending each of them in a three-dimensional shape. The movable arms 81b and 81c of this actuator 81 are constituted by arm members 81f and 81g and actuator layers 81h and 81i with a piezoelectric (PZT) structure formed by a semiconductor integration technique on side surfaces of the arm members 81f and 81g, respectively. The actuator layers 81h and 81i are formed not only on the side surfaces of the arm members 81f and 81g but also on side surfaces of the base 81a.

Only the coupling section 81d connected between the top end sections of the respective movable arms 81b and 81c is fixed to the surface of the magnetic head slider 80 opposite to the ABS, and there exists air gaps between the movable arms 81b and 81c and the side surfaces of the magnetic head slider 80.

Important in this embodiment is that the main portion of the actuator 81 is formed by a resilient metal plate and that the actuator layers 81h and 81i are not extended to the top end sections of the arm members 81f and 81g at which the members are fixed to the magnetic head slider 80 but terminated frontward positions from these top end sections. According to this structure, a stiffness of the movable arms 81b and 81c is not increased so high but is kept low. Thus, a large stroke of the actuator can be expected even if the actuator layers 81h and 81i do not have an ability for providing a large displacement.

As a result, the actuator layers 81h and 81i can be driven by a low voltage and therefore no detrimental effect on an electromagnetic conversion characteristics of the magnetic head element will occur. Also, a metal plate providing a low displacement can be selected for the actuator 81. Furthermore, since a material and a structure for the actuator are not limited, flexibility in designing an actuator shape becomes extremely high.

Furthermore, in this embodiment, since the magnetic head slider 81 is fixed to the coupling section 81d, an area used for fixing sufficiently increases and thus strong and reliable fixing of the slider can be achieved. This fixing of the slider to the coupling section 81d provides not only increase in the fixing strength due to increased fixing area but also improvement of a shock resistance against up-and-down movements because the stress is perpendicularly applied to this fixing portion not in the shearing direction when a shock is applied to the magnetic disk drive apparatus.

A length, a displacement and a moved amount of beginning positions of the actuator layers in this embodiment are substantially the similar to these of the embodiment of FIG. 1.

Since this actuator 81 is individually fabricated from the magnetic head slider 80, any type of actuator structures such as an electrostatic effect structure, an electrostrictive effect structure and electromagnetic inductive structure can be easily adopted other than a piezoelectric effect structure.

Because of the fact that the actuator layers are terminated at positions frontward from the portions at which the actuator is fixed to the magnetic head slider, following various advantages can be obtained:

(a) An actuator of a low-voltage drive type can be utilized to avoid to have a detrimental effect on an electromagnetic conversion characteristics of the magnetic head element;
(b) An actuator can be formed with a structure and of a material that will present a small displacement force; and
(c) High flexibility in designing an actuator can be expected.

Furthermore, since the actuator in this embodiment holds the magnetic head slider such that the slider is mounted in a space between the movable arms, the thickness of the HGA around the magnetic head slider does not increase even if the actuator is attached. Also, no cantilever structure of the actuator and the magnetic head slider is formed, the shock-resistance can be greatly improved. In addition, since the magnetic head slider is caught in between the movable arms, the top end sections of the movable arms, which actually transfer the displacement to the slider, can be extended to always position at the top end of the slider. Thus, it is possible to provide an enough stroke of the magnetic head slider.

In the aforementioned embodiments, the precise positioning actuators for the thin-film magnetic head elements are described. However, it is apparent that the present invention can be applied to a precise positioning actuator for a head element such as an optical head element other than the thin-film magnetic head element.

Many widely different embodiments of the present invention may be constructed without departing from the spirit and scope of the present invention. It should be understood that the present invention is not limited to the specific embodiments described in the specification, except as defined in the appended claims.

What is claimed is:

1. A precise positioning actuator to be fixed to a head slider provided with at least one head element, for precisely positioning said at least one head element, said actuator comprising:

a base; and
a pair of movable arms extending from said base and having slider fixing portions to be fixed to side surfaces of said head slider at top end sections thereof, each of said pair of movable arms including an arm member and an actuator layer formed on a side surface of said arm member and along a side surface of said base to induce a force for displacing said arm member in response to a drive signal applied to said actuator layer, said actuator layer extending along said side surface of said arm member to a frontward position of said slider fixing portion.

2. The actuator as claimed in claim 1, wherein said frontward position at which said actuator layer is terminated is a position at 50% of a total length of said arm member or more distance from said base.

3. The actuator as claimed in claim 2, wherein said frontward position at which said actuator layer is terminated is a position at 50–75% of a total length of said arm member distance from said base.

4. The actuator as claimed in claim 1, wherein a beginning position of said actuator layer locates on a side surface of said base.

5. The actuator as claimed in claim 1, wherein a beginning position of said actuator layer locates at a front of a rear edge of said actuator.

6. The actuator as claimed in claim 1, wherein each of said pair of movable arms is shaped so that there exists an air gap between said side surface of said head slider and said movable arm except for said slider fixing portion.

7. The actuator as claimed in claim 1, wherein said actuator layer comprises a piezoelectric element formed or adhered on the side surface of said arm member.

8. The actuator as claimed in claim 1, wherein a main portion of said actuator is made of a sintered ceramic.

9. The actuator as claimed in claim 1, wherein a main portion of said actuator is made of a metal plate.

10. The actuator as claimed in claim 1, wherein said at least one head element is at least one thin-film magnetic head element.

11. A head device including a head slider provided with at least one head element, and a precise positioning actuator fixed to said head slider for precisely positioning said at least one head element, said actuator comprising:

a base; and a pair of movable arms extending from said base and having slider fixing portions fixed to side surfaces of said head slider at top end sections thereof, each of said pair of movable arms including an arm member and an actuator layer formed on a side surface of said arm member and along a side surface of said base to induce a force for displacing said arm member in response to a drive signal applied to said actuator layer, said actuator layer extending along said side surface of said arm member to a frontward position of said slider fixing portion.

12. The head device as claimed in claim 11, wherein said frontward position at which said actuator layer is terminated is a position at 50% of a total length of said arm member or more distance from said base.

13. The head device as claimed in claim 12, wherein said frontward position at which said actuator layer is terminated is a position at 50–75% of a total length of said arm member distance from said base.

14. The head device as claimed in claim 11, wherein a beginning position of said actuator layer locates on a side surface of said base.

15. The head device as claimed in claim 11, wherein a beginning position of said actuator layer locates at a front of a rear edge of said actuator.

16. The head device as claimed in claim 11, wherein each of said pair of movable arms is shaped so that there exists an air gap between said side surface of said head slider and said movable arm except for said slider fixing portion.

17. The head device as claimed in claim 11, wherein a main portion of said actuator is made of a sintered ceramic.

18. The head device as claimed in claim 11, wherein a main portion of said actuator is made of a metal plate.

* * * * *